United States Patent
Akerib et al.

(10) Patent No.: US 12,259,859 B2
(45) Date of Patent: Mar. 25, 2025

(54) DEDUPLICATION OF DATA VIA ASSOCIATIVE SIMILARITY SEARCH

(71) Applicant: GSI Technology Inc., Sunnyvale, CA (US)

(72) Inventors: Avidan Akerib, Tel Aviv (IL); Dan Ilan, Herzliya (IL); Eli Ehrman, Beit Shemesh (IL); Elona Erez, Tel Aviv (IL)

(73) Assignee: GSI Technology Inc., Sunnyvale, CA (US)

(*) Notice: Subject to any disclaimer, the term of this patent is extended or adjusted under 35 U.S.C. 154(b) by 75 days.

(21) Appl. No.: 16/911,429

(22) Filed: Jun. 25, 2020

(65) Prior Publication Data

US 2021/0056085 A1     Feb. 25, 2021

Related U.S. Application Data

(60) Provisional application No. 62/978,336, filed on Feb. 19, 2020, provisional application No. 62/888,580, filed on Aug. 19, 2019.

(51) Int. Cl.
*G06F 16/21*     (2019.01)
*G06F 16/215*     (2019.01)
(Continued)

(52) U.S. Cl.
CPC .......... *G06F 16/215* (2019.01); *G06F 16/221* (2019.01); *G06F 16/24556* (2019.01); *G06F 16/273* (2019.01); *G06F 16/282* (2019.01)

(58) Field of Classification Search
CPC ................ G06F 16/215; G06F 16/221; G06F 16/24556; G06F 16/273; G06F 16/282;
(Continued)

(56) References Cited

U.S. PATENT DOCUMENTS

| 7,065,619 B1 * | 6/2006 | Zhu ..................... G06F 11/1453 |
| | | 707/999.201 |
| 7,457,813 B2 * | 11/2008 | Margolus .............. G06F 16/902 |
| | | 707/999.102 |

(Continued)

*Primary Examiner* — Kris E Mackes
*Assistant Examiner* — Cecile H Vo
(74) *Attorney, Agent, or Firm* — Heidi Brun Associates Ltd.

(57) ABSTRACT

A deduplication system includes a similarity searcher, a difference calculator, and a storage manager. The similarity searcher searches for a similar fingerprint in a database storing a plurality of local sensitive fingerprints, resembling a new fingerprint of a new block. The difference calculator computes a difference block between the input block and a similar block associated with the found similar fingerprint, and the storage manager updates the database with the new fingerprint and stores the difference block, if not empty, in a store. A method for deduplication includes searching in a database, storing a plurality of local sensitive fingerprints, a similar fingerprint, resembling a new fingerprint of a new block, calculating a difference block between the input block and a similar block associated with the similar fingerprint, if found, updating the database with the new fingerprint and storing the difference block, if it is not empty, in a storage unit.

11 Claims, 11 Drawing Sheets

(51) Int. Cl.
*G06F 16/22* (2019.01)
*G06F 16/2455* (2019.01)
*G06F 16/27* (2019.01)
*G06F 16/28* (2019.01)

(58) Field of Classification Search
CPC .... G06F 16/1748; G06F 16/23; G06F 16/245; G06F 16/28; G06F 16/174; G06F 11/1453; G06F 11/3442; G06F 16/2455; G06F 16/24553; G06F 16/24554; G06F 17/40; G06F 16/172; G06F 16/1752; G06F 16/1756; G06F 16/24522; G06F 16/2453; G06F 16/1724; G06F 16/27; G06F 16/25; G06F 3/0641; G06F 11/14
See application file for complete search history.

(56) References Cited

U.S. PATENT DOCUMENTS

| | | | |
|---|---|---|---|
| 8,392,384 B1* | 3/2013 | Wu | G06F 16/1748 711/134 |
| 9,256,378 B2* | 2/2016 | Zheng | G06F 3/0641 |
| 9,558,812 B2 | 1/2017 | Akerib | |
| 9,798,728 B2* | 10/2017 | Zheng | G06F 16/137 |
| 9,811,551 B1* | 11/2017 | Colgrove | G06F 3/0608 |
| 10,073,853 B2* | 9/2018 | Aronovich | G06F 16/152 |
| 10,656,859 B2* | 5/2020 | Jain | G06F 3/0673 |
| 11,238,106 B2* | 2/2022 | Kwan | G06F 16/2272 |
| 2006/0013451 A1* | 1/2006 | Haitsma | G06F 16/634 707/E17.009 |
| 2006/0112112 A1* | 5/2006 | Margolus | G06F 16/902 |
| 2007/0071330 A1* | 3/2007 | Oostveen | G06F 16/683 704/E11.002 |
| 2008/0005141 A1* | 1/2008 | Zheng | G06F 16/1752 |
| 2013/0097380 A1* | 4/2013 | Colgrove | G06F 3/0608 711/E12.017 |
| 2014/0229790 A1* | 8/2014 | Goss | G06F 11/1048 714/755 |
| 2014/0279956 A1* | 9/2014 | Trimble | G06F 3/0671 707/692 |
| 2015/0010143 A1* | 1/2015 | Yang | G06F 3/068 380/28 |
| 2015/0019509 A1* | 1/2015 | Aronovich | G06F 3/067 707/692 |
| 2015/0026135 A1* | 1/2015 | Aronovich | G06F 16/1752 707/692 |
| 2015/0363328 A1* | 12/2015 | Candelaria | G06F 3/0673 711/216 |
| 2016/0019232 A1* | 1/2016 | Lambright | G06F 16/1752 707/692 |
| 2016/0307021 A1* | 10/2016 | Kim | G06K 19/073 |
| 2017/0147598 A1* | 5/2017 | Sawada | G06F 3/0641 |
| 2017/0286005 A1* | 10/2017 | Sala | G06F 12/0864 |
| 2018/0060367 A1* | 3/2018 | Ioannou | G06F 16/215 |
| 2018/0341642 A1 | 11/2018 | Akerib | |
| 2019/0332300 A1* | 10/2019 | Singh | G06F 16/2255 |
| 2020/0301593 A1* | 9/2020 | Vaithianathan | G06F 3/0673 |
| 2020/0364269 A1* | 11/2020 | Kwan | G06F 16/1847 |
| 2021/0365413 A1* | 11/2021 | Shilane | G06F 18/22 |
| 2022/0107925 A1* | 4/2022 | Goswami | G06F 16/215 |
| 2022/0114181 A1* | 4/2022 | Kwan | G06F 18/23 |
| 2022/0121634 A1* | 4/2022 | Butcher | G06F 3/067 |

* cited by examiner

DEDUPLICATION OF DATA VIA ASSOCIATIVE SIMILARITY SEARCH

CROSS REFERENCE TO RELATED APPLICATIONS

This application claims priority from U.S. provisional patent applications 62/888,580, filed Aug. 19, 2019, and 62/978,336, filed Feb. 19, 2020, both of which are incorporated herein by reference.

FIELD OF THE INVENTION

The present invention relates to techniques for data deduplication generally and to improved deduplication techniques in particular.

BACKGROUND OF THE INVENTION

In computing, data deduplication (dedup) is a technique for eliminating duplicate copies of repeating data. This technique is used to improve storage utilization and is especially important when much of the huge amount of stored data is redundant. The same data may be redundantly stored when, for example, one employee sends an email with an attachment to a large mailing list of employees. In this case, the email system usually stores all the copies of the attachment.

In the deduplication process, unique blocks of data are identified and stored. New blocks are compared to the stored blocks and whenever a match occurs, the redundant block is replaced with a small reference that points to the stored block. Given that the same block may occur dozens, hundreds, or even thousands of times, the amount of data that must be stored can be reduced.

The intent of the deduplication is to inspect large volumes of data and identify large sections—such as entire files or large sections of files—that are identical and replace them with a shared copy. For example, a typical prior art email system might contain 100 instances of the same 1 MB (megabyte) file attachment. Each time the email platform is backed up, all 100 instances of the attachment are saved, requiring 100 MB storage space. With data deduplication, only one instance of the attachment is actually stored, and the subsequent instances are referenced back to the saved copy for deduplication ratio of roughly 100 to 1.

One form of data deduplication works by comparing complete blocks of data to detect duplicates. The block size may be defined by physical layer constraints (e.g. 4 KB block size) and may be as large as a complete file.

Other forms of deduplication work by first mapping each block to a much shorter bit string (referred to as its fingerprint) that uniquely identifies the original data for all practical purposes, and comparing the fingerprints. It may be appreciated that a fingerprint is able to capture the identity of a block, i.e. the probability of two non-identical blocks yielding the same fingerprint is negligible.

The fingerprinting may be done using any known algorithm including secured hash algorithms (SHA), such as SHA-1. The SHA-1 function operates on an input of any size and creates a 20B output. It operates such that a small change between various input blocks results in a random change in the 20B output, therefore, slight changes in the input blocks produce significant differences in the fingerprints.

A prior art system providing inline data deduplication (the deduplication is performed when data enters the system and not in a later stage) divides the data into blocks, creates a fingerprint for each block and compares the new input fingerprint with the fingerprints stored in a fingerprint table. If the comparison indicates that an exact same fingerprint exists in the database, it implies that a block, identical to the new block, is already stored and therefore, the entry in the database of the found fingerprint is updated to include the new block information. If the comparison failed (i.e. there is no entry in the fingerprint database identical to the new fingerprint), the new fingerprint is stored in the database, and the block is stored in the datastore.

Prior art systems providing offline deduplication procedures post-process the stored data to find and release already stored duplicated blocks, without impacting the throughput of the online process. Offline deduplication systems perform generally the same comparison operations but release duplicated blocks, instead of preventing their storage a priori.

Inline deduplication requires less storage and network traffic than offline deduplication since duplicate data is never stored or transferred; however, hash calculations may be computationally expensive and may impact the processing throughput.

SUMMARY OF THE PRESENT INVENTION

There is provided, in accordance with a preferred embodiment of the present invention, a deduplication system that includes a similarity searcher, a difference calculator, and a storage manager. The similarity searcher searches for a similar fingerprint, in a fingerprint database storing a plurality of local sensitive fingerprints, resembling a new fingerprint of an input block. The difference calculator computes a difference block between the input block and a similar block associated with the similar fingerprint if found and the storage manager updates the fingerprint database with the new fingerprint and stores the difference block in a storage unit, if the difference block is not empty.

Further, in accordance with a preferred embodiment of the present invention the storage manager stores said input block if a similar fingerprint was not found.

Still further, in accordance with a preferred embodiment of the present invention, the storage manager stores fingerprints in columns of an associative memory device and the similarity searcher performs the search inside the associative memory device.

Moreover, in accordance with a preferred embodiment of the present invention, the system also includes a fingerprint creator to create the new fingerprint using a locality-sensitive hashing (LSH) algorithm to create slightly different new fingerprints to slightly different input blocks.

Additionally, in accordance with a preferred embodiment of the present invention, the fingerprint database is arranged in a multi-level structure wherein upper levels comprise centroids to clusters in lower levels, and a lowest level that comprises fingerprints of blocks, the centroids calculated from the fingerprints.

Moreover, in accordance with a preferred embodiment of the present invention, the storage manager stores fingerprints of an uppermost level in columns of an associative memory device and wherein the search in the uppermost level is performed inside the associative memory device and the search in lower levels is performed in a CPU.

Further, in accordance with a preferred embodiment of the present invention, the system also includes a block splitter to split the input block to smaller sub-blocks, a collision resistance fingerprint creator to create a collision resistance fingerprint for each of said sub-blocks, an exact searcher to search in the fingerprint database an identical fingerprint matching the collision resistance fingerprint. The storage manager updates the fingerprint database with the collision resistance fingerprints and stores sub-blocks for which identical fingerprints were not found.

There is provided, in accordance with a preferred embodiment of the present invention, a method for deduplication. The method includes searching in a fingerprint database, storing a plurality of local sensitive fingerprints, a similar fingerprint, resembling a new fingerprint of an input block, calculating a difference block between the input block and a similar block associated with the similar fingerprint, if found, updating the fingerprint database with the new fingerprint and storing the difference block in a storage unit, if the difference block is not empty.

Further, in accordance with a preferred embodiment of the present invention, the step of storing also includes storing the input block if a similar fingerprint was not found.

Still further, in accordance with a preferred embodiment of the present invention, the method also includes loading the fingerprints into columns of an associative memory device and the step of searching is performed inside the associative memory device.

Additionally, in accordance with a preferred embodiment of the present invention, the method includes creating the new fingerprint using a locality-sensitive hashing (LSH) algorithm to create slightly different new fingerprints to slightly different input blocks.

Moreover, in accordance with a preferred embodiment of the present invention, the fingerprint database is a hierarchical database arranged in a multi-level structure where upper levels include centroids to clusters in lower levels, the centroids calculated from the fingerprints and a lowest level that includes fingerprints of blocks.

Additionally, in accordance with a preferred embodiment of the present invention, the loading includes loading fingerprints of an uppermost level into columns of an associative memory and the searching includes performing a search in the uppermost level by an associative memory device and performing a search in lower levels by a CPU.

Furthermore, in accordance with a preferred embodiment of the present invention, the method also includes splitting the input block to smaller sub-blocks, creating a collision resistance fingerprint for each of the sub-blocks, performing an exact search to find exact match to each of the collision resistance fingerprints in a fingerprint database. The method also includes updating the fingerprint database with the collision resistance fingerprints and storing the sub-blocks for which identical fingerprints were not found.

Still further, in accordance with a preferred embodiment of the present invention, the method also includes performing an exact search between a fingerprint of the in-out block and a database of fingerprints created using a collision resistance algorithm and perform the searching if an exact match is not found.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that the performance and throughput of the online deduplication operation may be enhanced by improving both the fingerprint creation step and the fingerprint comparison step. Applicant has also realized that storage efficiency may be improved by storing only relative changes between similar blocks and not entire blocks that are slightly changed (e.g. versions of a document, or source code, or images/videos which have only small amount of changes).

Applicant has further realized that a fingerprinting method that provides slightly different output when operating on slightly different blocks, such as locality-sensitive hashing (LSH) algorithms, may be used to provide slightly different fingerprints to slightly different blocks and therefore provide a way to distinguish between cases of identical, similar and dissimilar blocks (instead of distinguishing only between cases of identical and different blocks as in the prior art deduplication methods). Applicant has further realized that a method to search for similar fingerprints such as the Hamming distance or the Tanimoto distance may be used to compare fingerprints and find the most similar blocks.

Embodiments of the present invention may improve the performance and the storage efficiency of the deduplication operation by using LSH algorithms to create similar fingerprints to similar blocks, store the fingerprints in a memory device capable of performing associative processing and executing an efficient similarity search between a new fingerprint and the stored fingerprints to find a similar fingerprint, if such exist. The new fingerprint may eventually be stored and either the entire dissimilar block or the changes between the new block and an already stored similar block (indicated by the detected similar fingerprints) may be stored in the datastore. An additional improvement may be achieved by storing the fingerprints in a hierarchical fashion in columns of an associative memory device, as described herein below.

It may be noted that embodiments of the present invention may use a memory device such as the one described in U.S. Pat. No. 9,558,812, assigned to the common assignee of the present invention and incorporated herein by reference. It may also be noted that the similarity search may be like the one described in US 2018/0341642 assigned to the common assignee of the present invention and incorporated herein by reference.

Figure 1:
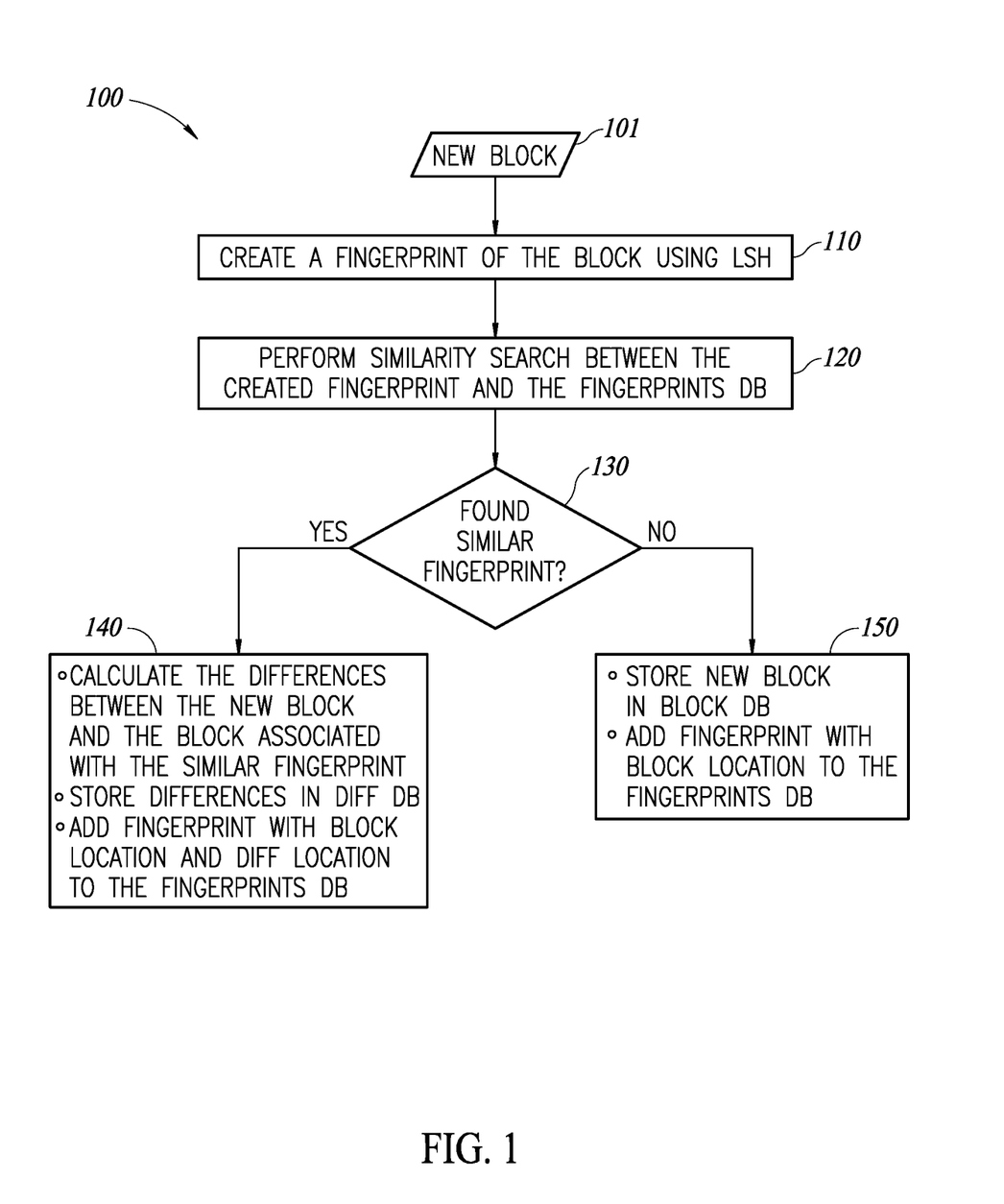
FIG. 1 is a schematic illustration of a flow implemented by deduplication systems, constructed and operative in accordance with an embodiment of the present invention.

FIG. 1, to which reference is now made, is a schematic illustration of a flow 100, implemented by systems constructed in accordance with an embodiment of the present invention.

In step 110 the system may receive a new block 101 and may create a new fingerprint to the new block using an LSH algorithm. In step 120 the system may perform a similarity search between the new fingerprint and the fingerprints stored in a local sensitive fingerprint database. In step 130 the system may check if a similar fingerprint was found, where a similar fingerprint may be a fingerprint whose distance from the created fingerprint is smaller than predefined threshold. If a similar fingerprint was found, in step 140 the system may calculate the difference between the new block 101 and the stored block associated with the located similar fingerprint, update the fingerprint information in the fingerprint database and store the calculated differences in a difference datastore. If a similar fingerprint was not found, in step 150 the system may store the new block in a datastore and add the new fingerprint to the fingerprint database.

Figure 2A:
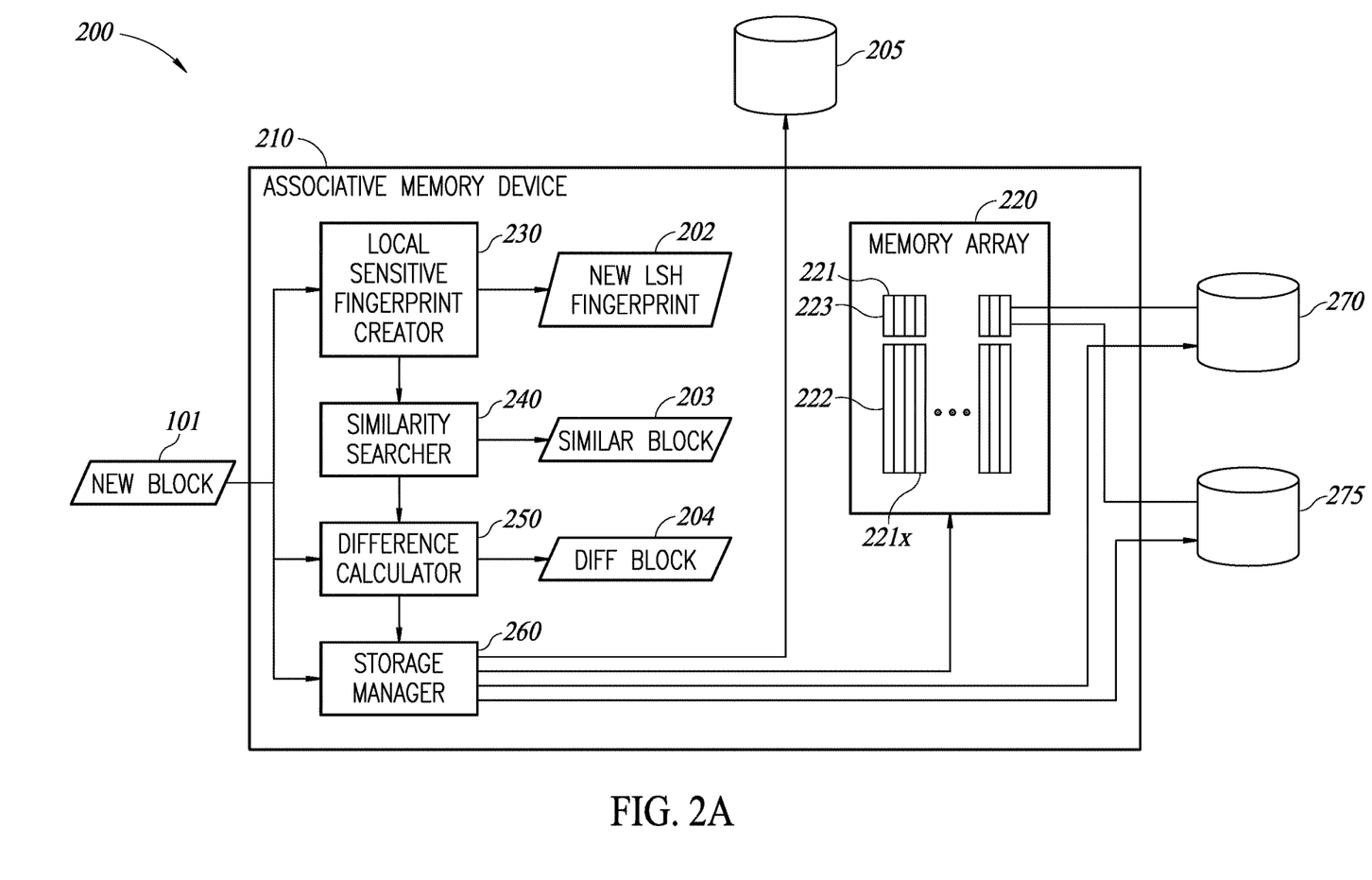
FIGS. 2A and 2B are schematic illustrations of a deduplication system, constructed and operative in accordance with an embodiment of the present invention, implementing the flow of FIG. 1.

FIG. 2A, to which reference is now made, is a schematic illustration of a deduplication system 200 implementing flow 100, constructed and operative in accordance with an embodiment of the present invention. Deduplication system 200 comprises a fingerprint database 205 to store fingerprints of blocks, an associative memory device 210, a block datastore 270, to store entire blocks of data and a diff datastore 275 to store changes between stored blocks and slightly different blocks.

Associative memory device 210 comprises a memory array 220, a local sensitive fingerprint creator 230, a similarity searcher 240, a difference calculator 250 and a storage manager 260.

Memory array 220 comprises a plurality of columns to store records 221, each record represents a block. Record 221 comprises a fingerprint 222 (a key to a specific block) and a value 223. Fingerprint 222 may capture the identity of a block and value 223 may have, among other data, information about the location of a block in block datastore 270 similar or identical to the represented block, and possible information about the location of a difference block (containing changes between an existing block in block datastore 270 and the block represented by record 221) in diff datastore 275, if the specific block is slightly different from a stored block.

Local sensitive fingerprint creator 230 may receive new block 101 and may create a new LSH fingerprint 202 using an LSH algorithm. As mentioned herein above, an LSH algorithm may create a slightly different output to a slightly different input, thus local sensitive fingerprint creator 230 may create slightly different fingerprints to slightly different blocks.

Similarity searcher 240 may compare between new LSH fingerprint 202 and fingerprints 222 (of records 221) stored in memory array 220. If similarity searcher 240 found a similar fingerprint 222x (fingerprint 222 of record 221x), it fetches similar block 203, associated with fingerprint 222x. If similarity searcher 240 found more than one similar fingerprint 222x it selects the one that is most similar to (most resembles) new block 101. If similarity searcher 240 did not find any similar fingerprint, it indicates that none was found.

Similarity searcher 240 may use any known distance calculation algorithm (such as the Hamming distance or the Tanimoto distance algorithm mentioned herein above) and select fingerprint 222x (having the minimum distance value as most similar). Fingerprint 222x may be considered to resemble (be similar to) similar new LSH fingerprint 202 when the calculated distance between the two fingerprints is smaller than a pre-determined value (threshold) and may not find a similar fingerprint 222x otherwise.

If similarity searcher 240 located a similar fingerprint 222x, a similar block 203 may be fetched from block datastore 270. Difference calculator 250 may calculate the differences between new block 101 and similar block 203 and may create a diff block 204 containing information about the differences. New block 101 may be recovered from similar block 203 and diff block 204. It may be appreciated that diff block 204 is typically smaller than new block 201 therefore may utilize less space than storing the entire block. When the data is composed of documents, difference calculator 250 may use an edit search approach to create diff block 204 that includes edit instruction needed to be performed on similar block 203 in order to generate new block 101.

Storage manager 260 may handle new block 101, diff block 204 and new LSH fingerprint 202. Storage manager 260 may store new block 101 in block datastore 270, may store diff block 204 in diff datastore 275, may create a new record 221 from new LSH fingerprint 202 and the information relevant to new block 101 regarding the locations of the related blocks (similar block in block datastore 270 and diff block 204 in diff datastore 275) and may insert new record 221 to fingerprint database 205.

Figure 2B:
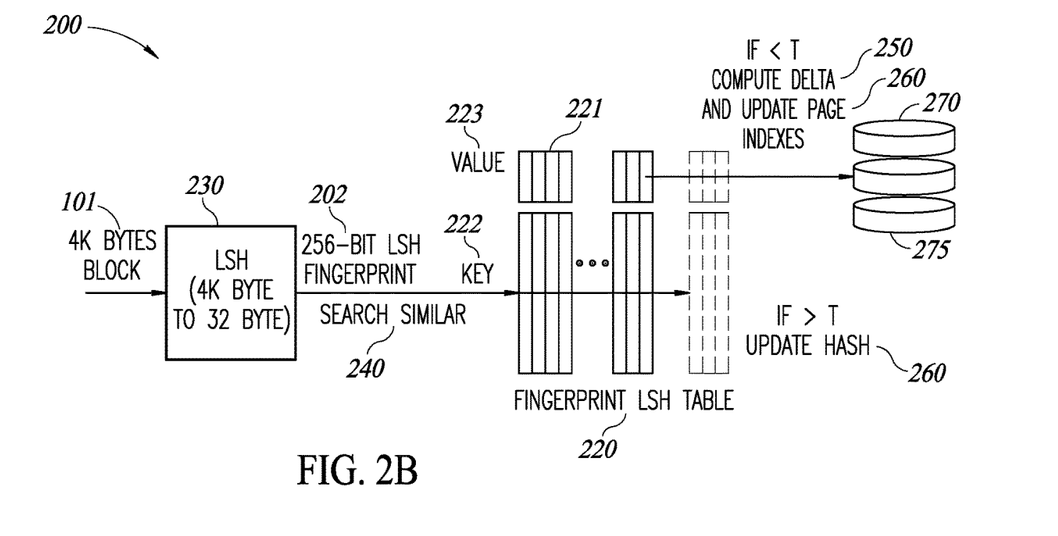

FIG. 2B provides an alternative view of system 200, where identical reference numerals indicate matching elements.

Applicant has further realized that similarity searcher 240, and storage manager 260 may provide enhanced performance when records 221 are arranged in levels. When records 221 are organized in a flat arrangement, similarity searcher 240 may need to compare LSH fingerprint 202 of new block 101 to all previously created fingerprints 222 stored in records 221 to find the most similar fingerprint, an expensive operation when the number of fingerprints is large (petabytes). However, if storage manager 260 manages records 221 in clusters, arranged in a hierarchical structure, similarity searcher 240 may search only relevant clusters instead of the entire database and thus, may improve the search efficiency. The number of levels in a hierarchy may be determined by the anticipated size of the database or any other characteristic that may impact the size of the storage and/or the efficiency of the search. It may be appreciated that a multilevel hierarchical structure of keys may be also used by other applications that need to perform efficient searches.

Figure 3:
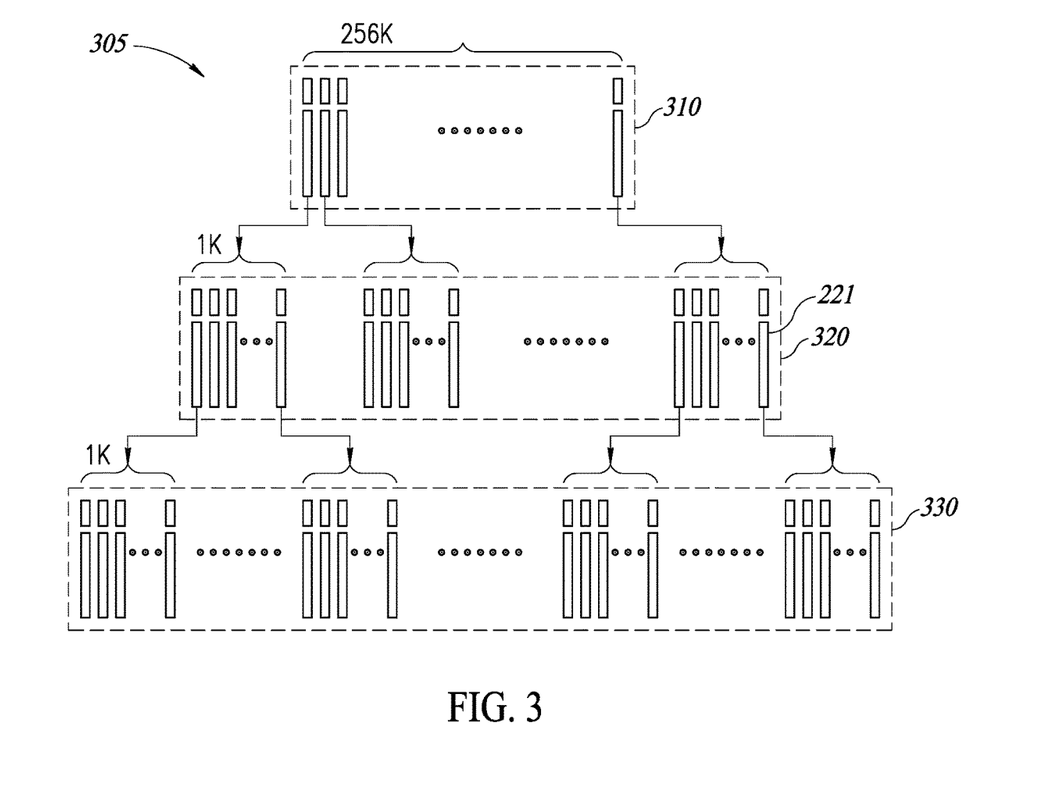
FIG. 3 is a schematic illustration of an alternative embodiment of a fingerprint database, organized in a hierarchical structure, constructed and operative in accordance with an embodiment of the present invention.

FIG. 3, to which reference is now made, is a schematic illustration of an alternative embodiment of a fingerprint database 305 organized in a three-level hierarchical structure. In this example, 1 petabyte fingerprint records 221 may be divided such that a first, uppermost, level 310 may store 256K fingerprint records 221, each is a centroid of a cluster of 1K fingerprint records 221 stored in a second intermediate level 320, and each fingerprint record 221 in second level 320 is a centroid of a cluster of 1K fingerprints in a third lowest level 330.

Level 310 storing the first level of centroids, is referred herein as the uppermost level of hierarchical database 305, storing the largest number of fingerprints. Level 330, storing the actual fingerprints, is referred herein as the lowest level. Intermediate level 320, located between uppermost level 310 and lowest level 330, may store an intermediate level of centroids. It may be appreciated that hierarchical database 305 may include any number of intermediate levels 320 and is not limited to a single intermediate level.

It may be appreciated that the centroid in each level comprises a fingerprint that represents a group of fingerprints in the next level where all members of the group resemble (are similar to) each other and are different from fingerprints in other groups. The centroid may be calculated as the center of the cluster it represents.

It may be appreciated that the number of fingerprint records 221 stored in such hierarchy is 256K×1K×1K which represent 1 PB data stored in datastores 270 and 275. As mentioned herein above, loading fingerprint record 221 to associative memory device 210 may enable performing an efficient similarity search.

Figure 4A:
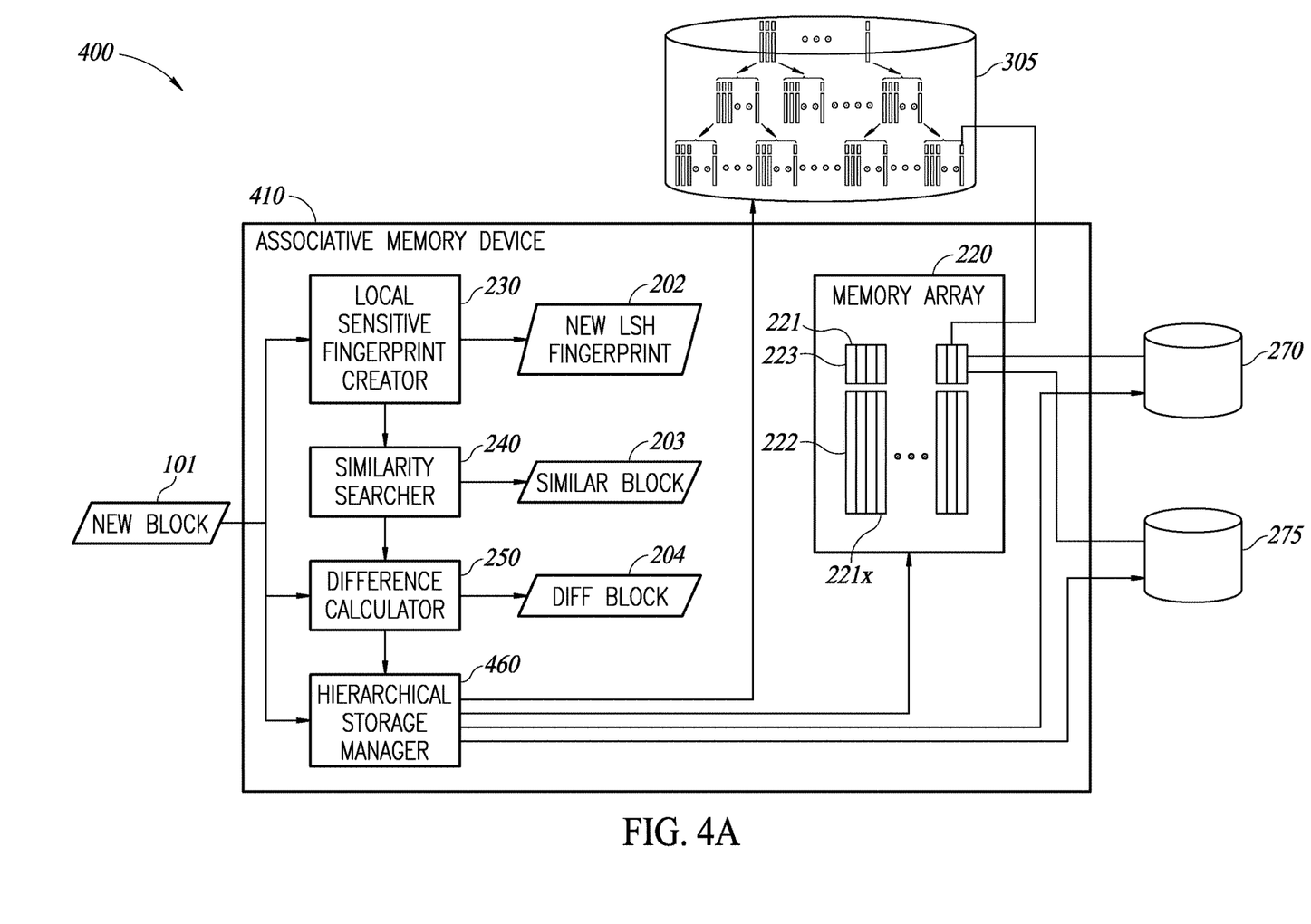
FIGS. 4A, 4B and 4C are schematic illustrations of a deduplication system utilizing the hierarchical database of FIG. 3, constructed and implemented in accordance with an embodiment of the present invention.

FIG. 4A, to which reference is now made, is a schematic illustration of a deduplication system 400, constructed and implemented in accordance with an embodiment of the present invention. Deduplication system 400 is an alternative embodiment of deduplication system 200, comprising a hierarchical fingerprint database 305, and an associative memory device 410 to perform the similarity search on hierarchical fingerprint database 305. Deduplication system 400 comprises also a block datastore 270 and a diff datastore 275.

Associative memory device 410 comprises a hierarchical storage manager 460 to handle fingerprint database 305, a memory array 220, a local sensitive fingerprint creator 230, a similarity searcher 240 and a difference calculator 250.

Hierarchical storage manager 460 may perform a multi-level similarity search on hierarchical fingerprint database 305 with any number of levels. In the example of FIG. 4, three levels are shown. Each level may be stored in a storage unit in fingerprint database 305 and may be downloaded to memory array 220 when similarity searcher 240 needs to perform a search on that level. It may be appreciated that similarity searcher 240 may use a CPU to perform a similarity search on lower levels (intermediate and lowest) of hierarchical fingerprint database 305 when those are small and contain around 1K fingerprints, instead of downloading them to memory array 220 and performing the similarity search on the associative memory.

As mentioned herein above, each fingerprint record 221 comprises a key and a value and similarity searcher 240 may use the key part to search a similar key on memory array 220. The value of a fingerprint in all levels except for the last level includes information regarding the next level of records where a search may continue if a search in the current level succeeds, indicating a similar block may already be stored in datastore 270. It may be appreciated that the key in all levels has the same structure. In the upper levels (uppermost and intermediate levels), the key is calculated as a centroid of the keys in the next level and in the lowest level the key is the actual fingerprint calculated for a specific block.

Similarity searcher 240 may complete its search when either a similar fingerprint 222x is found in the last level or when a similar fingerprint is not detected (in any level). Similarity searcher 240 may determine that fingerprint 222x in memory array 220 (is similar to) resembles new LSH fingerprint 202, if the distance between them is smaller than a threshold. A different threshold may be defined to each level. If similarity searcher 240 did not find any similar fingerprint 222x, it indicates that none was found. If similarity searcher 240 found a similar fingerprint 222x, in a level that is not the last level, hierarchical storage manager 460 may download the next level of fingerprints to memory array 220 and let similarity searcher 240 perform the search in the new downloaded fingerprints.

If similarity searcher 240 found a similar fingerprint 222x in the last level, difference calculator 250 may calculate a diff block 204, hierarchical storage manager 460 may store diff block 204 in diff datastore 275 and update the information associated with new LSH fingerprint 202 to include the location of similar block 203, associated with fingerprint 222x, and the location of diff block 204 containing the differences.

Figure 4B:
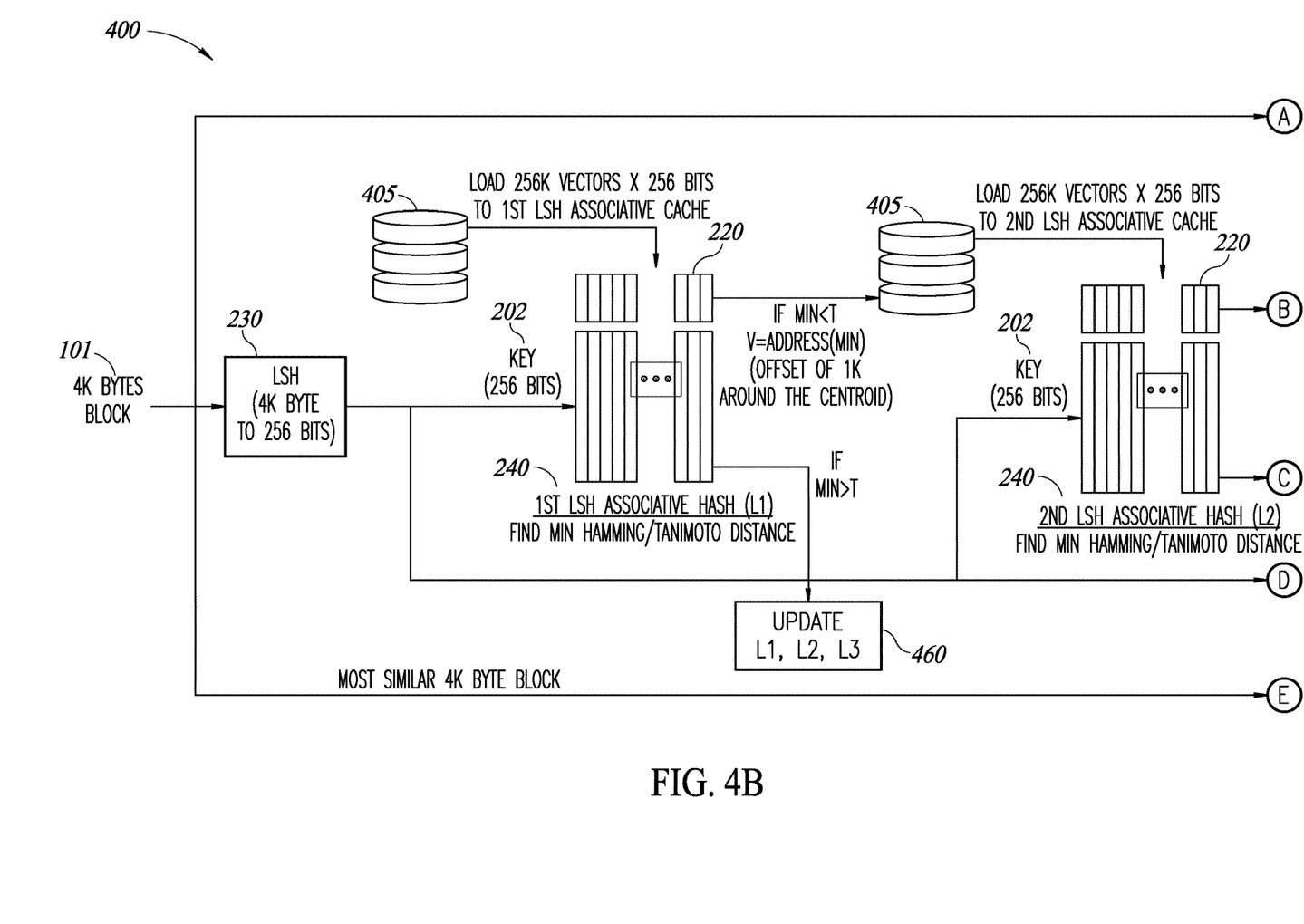
Figure 4C:
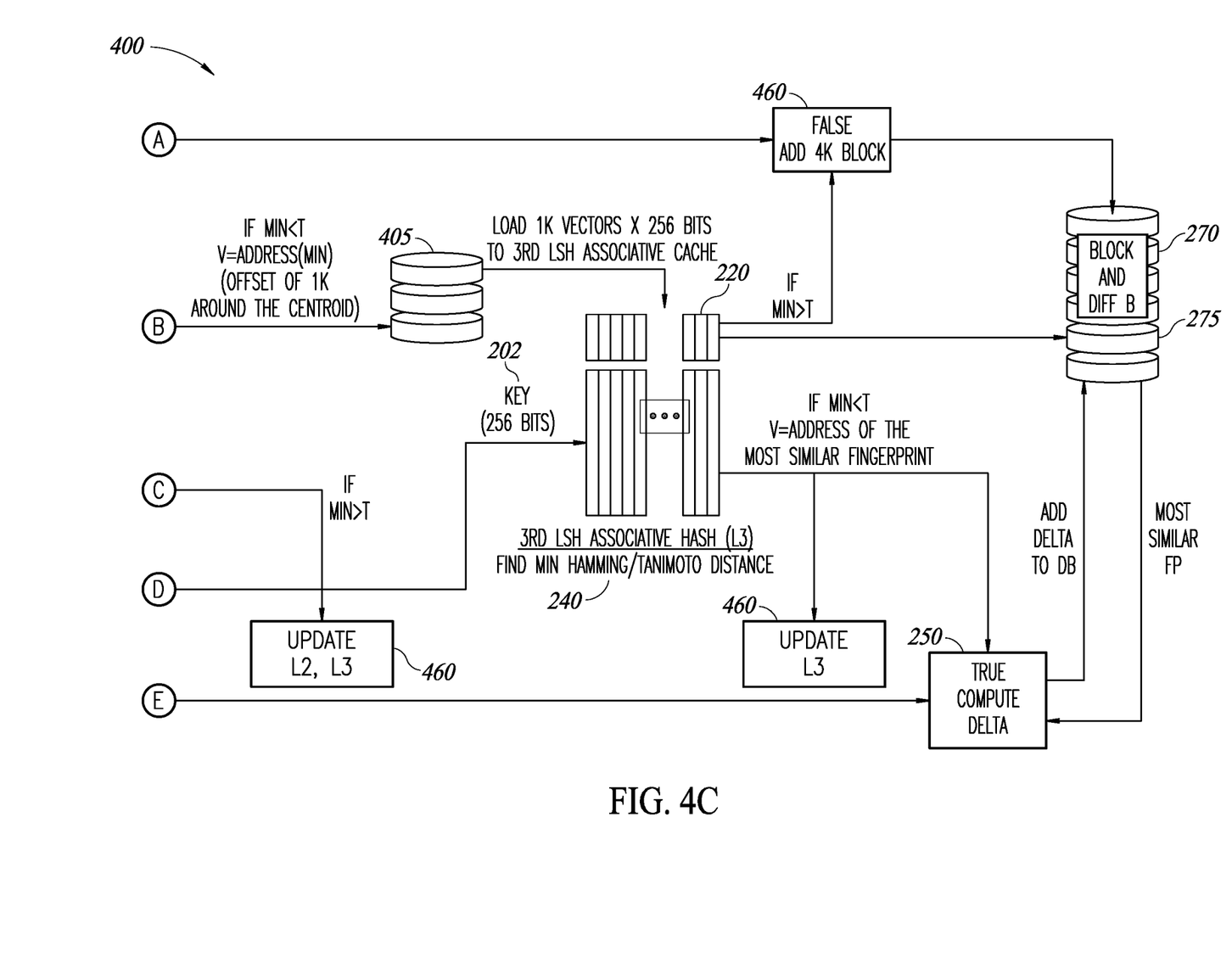

FIGS. 4B and 4C together provide an alternative view of system 400, where identical reference numerals indicate matching elements.

Figure 5:
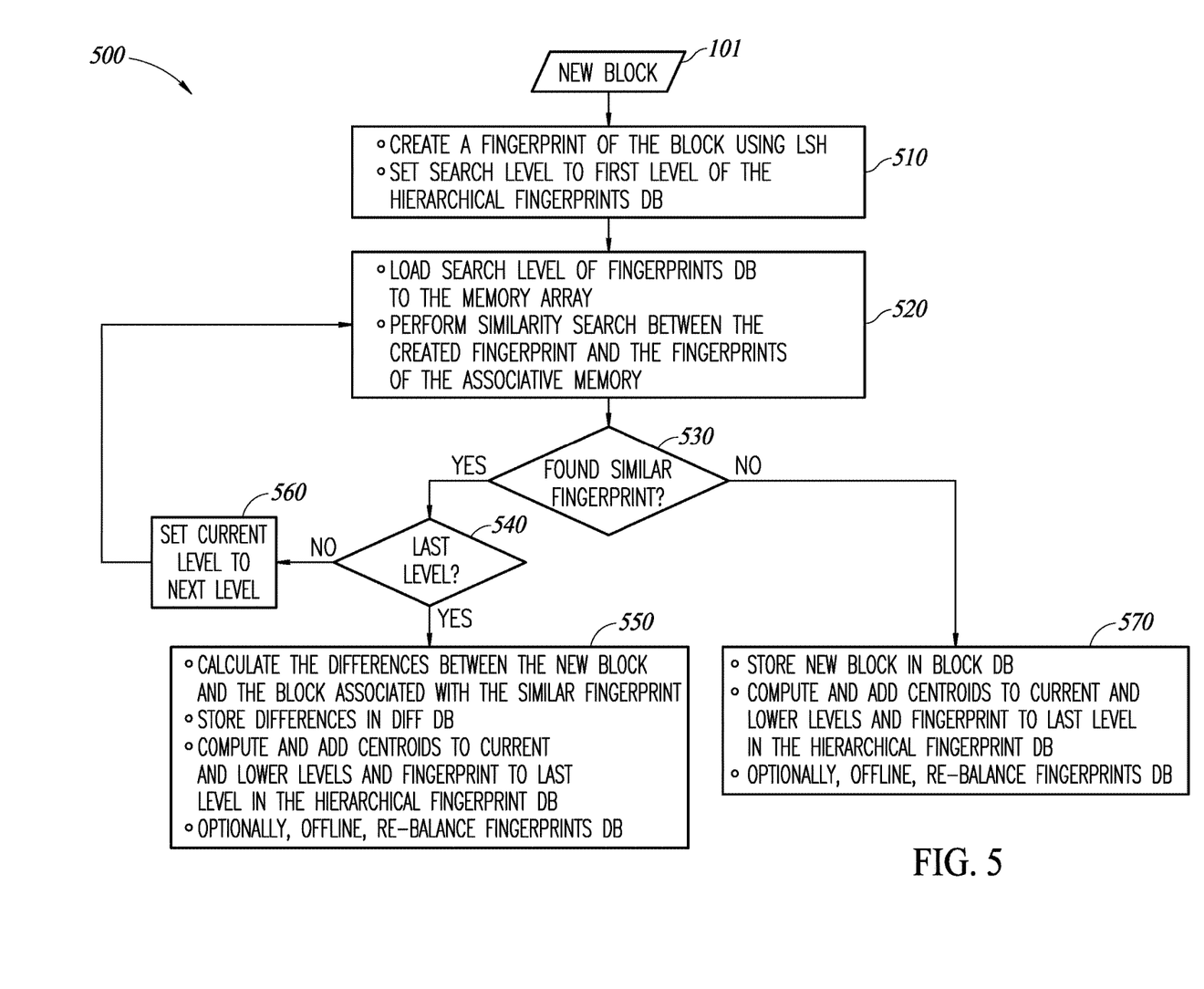
FIG. 5 is a schematic illustration of a flow implemented by the system of FIGS. 4A, 4B and FIG. 4C, constructed and operative in accordance with an embodiment of the present invention.

FIG. 5, to which reference is now made, is a schematic illustration of a flow 500, implemented by system 400, constructed and operative in accordance with an embodiment of the present invention. In flow 500, records 221 may be stored in three levels of hierarchical fingerprint database 305, where records in each level, except the last one in the hierarchy may store centroids to the next level, and the last level may store fingerprints pointing to the actual relevant blocks in block datastore 270 and in diff datastore 275.

In step 510, associative memory device 210 may receive a new block 101, may set the search level to be the first level of hierarchical fingerprint database 305 and local sensitive fingerprint creator 230 may create a new LSH fingerprint 202 for new block 101. In step 520, hierarchical storage manager 460 may load records 221 from the search level of hierarchical fingerprint database 305 to memory array 220 and similarity searcher 240 may perform a similarity search between new LSH fingerprint 202 and records 221 stored in memory array 220. In step 520 similarity searcher 240 may determine if a fingerprint 222x, resembling (similar to) new LSH fingerprint 202, has been found. If a similar fingerprint has not been found, associative memory device 210 may continue to step 570; however, if a fingerprint 222x has been found, in step 540 the search level is examined. If the search level, where the similar fingerprint 222x has been found, is the last level of fingerprint database 305, associative memory device 210 may continue to step 550, otherwise step 560 may be executed.

If a similar fingerprint 222x was found in the last level, in step 550, difference calculator 250 may fetch similar block 203, the block associated with the similar fingerprint 222x, calculate the differences between new block 101 and similar block 203 and create a diff block 204. Hierarchical storage manager 460 may store diff block 204 in diff datastore 275 and a new record 221 (that may include new LSH fingerprint 202 the block location of similar block 204 in block datastore 270 and the location of diff block 204 in diff datastore 275) in the current search level of hierarchical fingerprint database 305. Hierarchical storage manager 460 may, optionally, re-balance fingerprint database 305 if the clusters become un-balanced.

If a similar block 203 was found in an intermediate level, in step 560 the level is updated and associative memory device 210 may go back to step 520 with the new level in fingerprint database 305. In step 570, reached when a similar fingerprint 222x has been found, hierarchical storage manager 460 may store new block 101 in block datastore 270 and may update fingerprint database 305 with the new record 221 including LSH fingerprint 202. Hierarchical storage manager 460 may optionally re-balance fingerprint database 305 if it becomes unbalanced.

As mentioned herein above, fingerprint database 305 may be arranged in levels, and in different steps, different parts of the database may be loaded to memory array 220. Each record may be stored as a vector in a column of memory array 220. The vector comprises a key—the fingerprint identifying a specific block and a value. In the last level, the value includes the location of a similar or identical block and optionally the location of a diff block. In all other levels, (except for the last one) the key of the record is a centroid representative of a group of similar fingerprints and the value includes the address of a cluster of vectors represented by the centroid.

Records in all levels may have the same key format and similarity searcher 240 may perform the same search in each level. Typically, the first level may contain the largest set of records and may be stored in memory array 220, and other levels may contain a smaller number of records which may be loaded to memory array 220 as needed or, as mentioned herein above, are processed by a CPU. In the example of FIG. 3, the number of records in the first level is 256K and the number of records in each other level is 1K.

Figure 6:
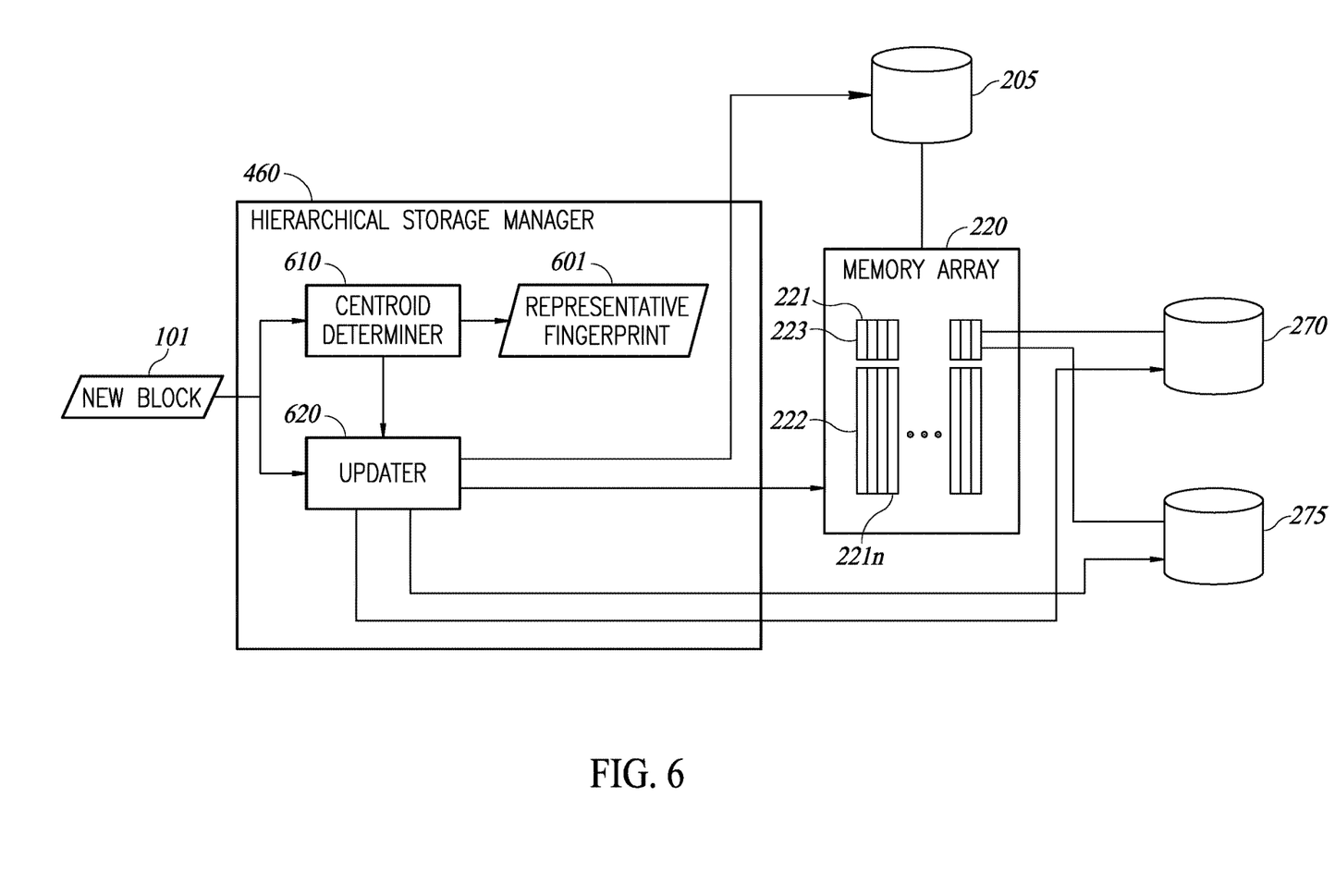
FIG. 6 is a schematic illustration of a hierarchical storage manager, constructed and operative in accordance with an embodiment of the present invention, managing the hierarchical database of FIG. 3.

FIG. 6, to which reference is now made, is a schematic illustration of hierarchical storage manager 460, constructed and operative in accordance with an embodiment of the present invention. Hierarchical storage manager 460 may be responsible for all aspects of storage of associative memory device 210 and the databases it uses. Hierarchical storage manager 460 comprises a centroid determiner 610 and an updater 620.

Centroid determiner 610 may calculate a new representative fingerprint 601 (centroid) after similarity searcher 240 did not find a similar fingerprint in a level other than the last one. New representative fingerprint 601 may be calculated as the average of all fingerprints in the cluster it represents.

Updater 620 may use new representative fingerprint 601 when updating levels other than the last level in flow 500 (FIG. 5) but may use new LSH fingerprint 202 when updating the last level.

The overhead of writing a new block 101 using deduplication system 400 may include a search in fingerprint database 305. If the search succeeded, the write operation may comprise an update of the information associated with similar fingerprint 222x and a store operation of diff block 204 in diff datastore 275. If the search failed, the write operation may comprise a write operation of new block 101 to block datastore 270 and an update of fingerprint database 305.

The overhead of fetching a block Y from deduplication system 400 may comprise a read operation from block datastore 270 to get a block 221y and optionally a read operation from diff datastore 275 combined with an operation to reconstruct the original block by applying the differences on block 221y.

The size and performance of associative memory device 210 may depend on the size of the data the system should handle. The size of memory array 220 may depend in addition to the size of the data needed to be handled, on the number of levels in hierarchical database 305.

For a system designed to handle 1 PB data, made of 256G blocks of 4K, each block represented by a 256-bit fingerprint, the size of the levels may determine the size of memory array 220. Assuming the size of the first level is 256K and the size of each other level is 1K, the needed size is 256K+1K+1K which is 258K. The first largest level (256K) may be loaded to memory array 220 offline and may remain there throughout the operation of associative memory device 210. The next much smaller levels (second and third levels of clusters, the size of each cluster 1K) may be loaded to memory array 220 in runtime and may alternatively be processed in the CPU. It may be noted that the size of fingerprint database 305 for storing 1 PB data in blocks of 4K may be around 8 TB (256b/8 256K×1K×1K).

It may be appreciated that deduplication system 400 may be cheaper than existing deduplication systems. The fast similarity search is cheaper, and the storage needed to store the same number of blocks is smaller because only changes between similar blocks are stored (instead of storing entire blocks which are slightly different). Reducing the total size of the storage may also reduce the number of elements needed to handle the storage such as fewer storage drivers, fewer storage servers and the like. The hierarchical fingerprint database 305 may be built online and may be re-balanced offline (to maintain its representativeness of the entire block store and to keep it from being skewed) to maintain its performance. It may be an ideal solution for solid-state drive (SSD) storage to which the write frequency should be minimal.

It may be appreciated that an additional embodiment of a deduplication system may include a module that first performs an exact search between a fingerprint of the new block and a database of fingerprints created using a collision resistance algorithm such as SHA-1, as is performed in existing systems, and use the associative memory device 410 described herein above to store only differences once an exact match is not found.

Some users, used to existing deduplication systems (storing entire blocks), may be reluctant to store differences from which an original block may be recreated and may feel safer if an original content is accessible without any recreation procedures. A system that keeps the original content while providing improved storing efficiency (i.e. minimize duplications) with respect to current deduplication systems, may perform the similarity search on the new block, as described herein above, but may divide each new block to sub blocks for which the fingerprint may be created by a collision resistance hash function such as the message-digest algorithm MD5 or the cyclic redundancy check (CRC) that creates smaller fingerprints, and may store only the sub-blocks that differ between two similar blocks. The original block may be easily composed from the stored sub-blocks.

Figure 7A:
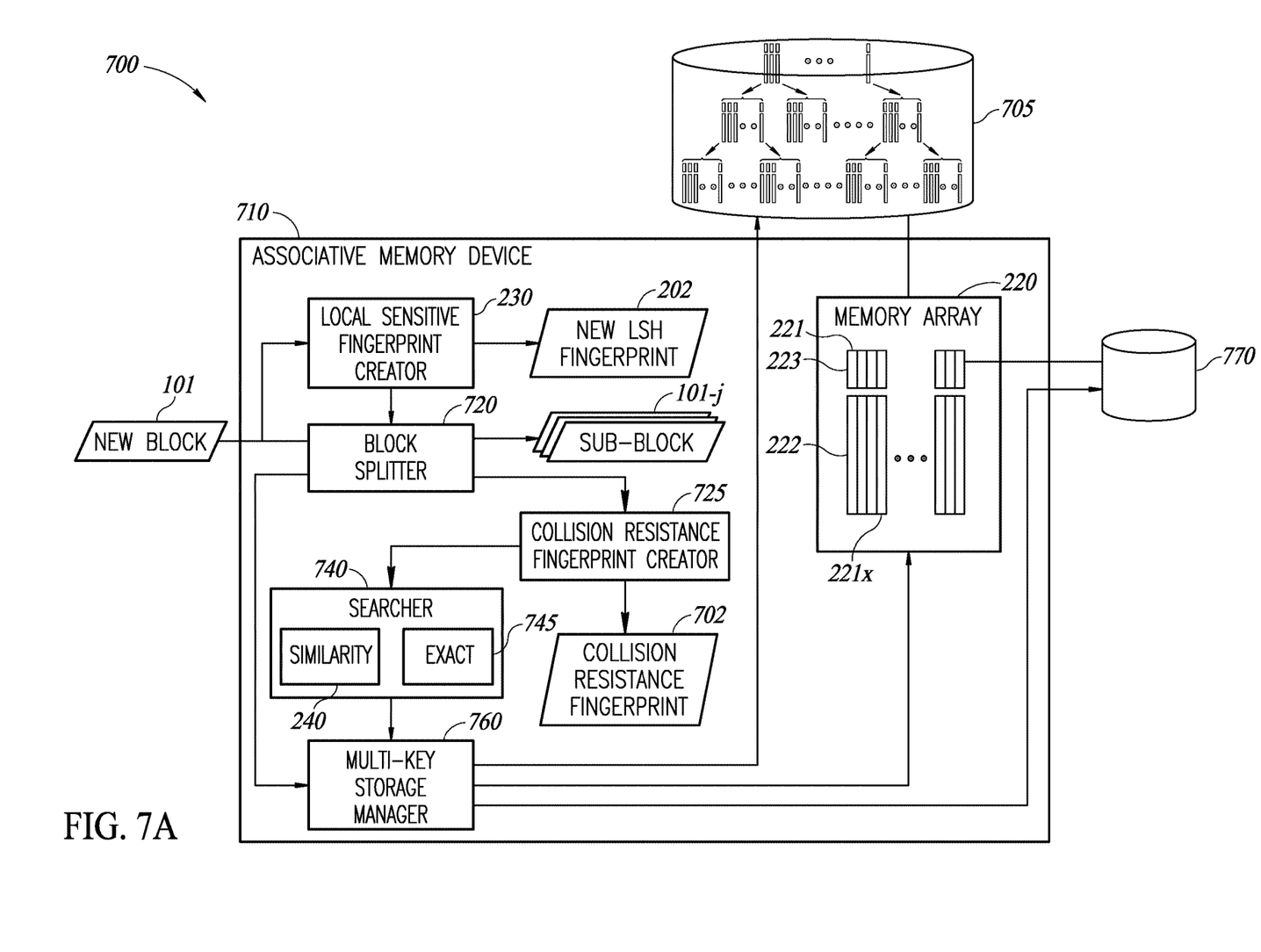
FIGS. 7A, 7B and 7C are schematic illustrations of a deduplication system handling sub-blocks, constructed and operative in accordance with an embodiment of the present invention.

FIG. 7A, to which reference is now made, is a schematic illustration of deduplication system 700 handling sub-blocks, constructed and operative in accordance with an embodiment of the present invention. Deduplication system 700 comprises an associative memory device 710 a multi-key hierarchical fingerprint database 705 and a block store 770. Block store 770 may store sub-blocks 101-$j$ of each new input block 101. Associative memory device 710 comprises a local sensitive fingerprint creator 230 a block splitter 720 a collision resistance fingerprint creator 725 a searcher 740 (that comprises an exact searcher 745 in addition to similarity searcher 240) and a multi-key storage manager 760.

Multi-key hierarchical fingerprint database 705 may store different type of keys in different levels of the hierarchy. In the upper levels (all levels except the lowest) fingerprint database 705 may store records for which the fingerprint 222 is an LSH key, like new LSH fingerprint 202 and may also store records for which the fingerprint is a collision resistance key, like new collision resistance fingerprint 702. The key of a record in upper levels of multi-key hierarchical fingerprint database 705 may be a centroid fingerprint, and the key of a record in the lowest level may be a collision resistance fingerprint 702 providing access to a sub-block 101-$j$ of block 101.

Local sensitive fingerprint creator 230 may create new LSH fingerprint 202. Block splitter 720 may split block 101 to smaller sub-blocks 101-$j$. For example, if the size of block 101 is 4K, block splitter 720 may split it to 16 sub-blocks 101-$j$ of 256 bytes each. Collision resistance fingerprint creator 725 may create a new collision resistance fingerprint 702 to each sub-block 101-$j$. Similarity searcher 240 may perform a similarity search on upper levels of multi-key hierarchical fingerprint database 705, storing centroids, looking for a record with a fingerprint resembling new LSH fingerprint 202.

Exact searcher 745 may perform an exact search between new collision resistance fingerprint 702 of each sub-block 101-$j$ and records in the lowest level of fingerprint database 705 looking for an identical fingerprint.

If similarity searcher 240 does not find a similar fingerprint 222$x$ (similar to new LSH fingerprint 202) when searching the upper levels (an exact match was not found), multi-key storage manager 760 may insert all sub-blocks 101-$j$ of new block 101 to database 705, update the upper levels of multi-key hierarchical fingerprint database 705 with the relevant centroids, created using LSH fingerprint 202, and updating the lowest level of multi-key hierarchical fingerprint database 705 with collision resistance fingerprints 702 of sub blocks 101-$j$.

If similarity searcher 240 finds a similar fingerprint 222$x$ in the upper layers, exact searcher 745 may perform an exact search to locate each new-collision resistance fingerprint 702. If an identical collision resistance fingerprint has been found (exact match was found), multi-key storage manager 760 may update collision resistance fingerprint 702 to include the location of the identical sub-block. If an identical fingerprint has not been found in the lowest level of multi-key hierarchical fingerprint database 705, multi-key storage manager 760 may use LSH fingerprint 202 to update the centroids in the upper levels, insert the computed centroids to multi-key hierarchical fingerprint database 705 and insert new sub-blocks 101-$j$ to database 705.

Figure 7B:
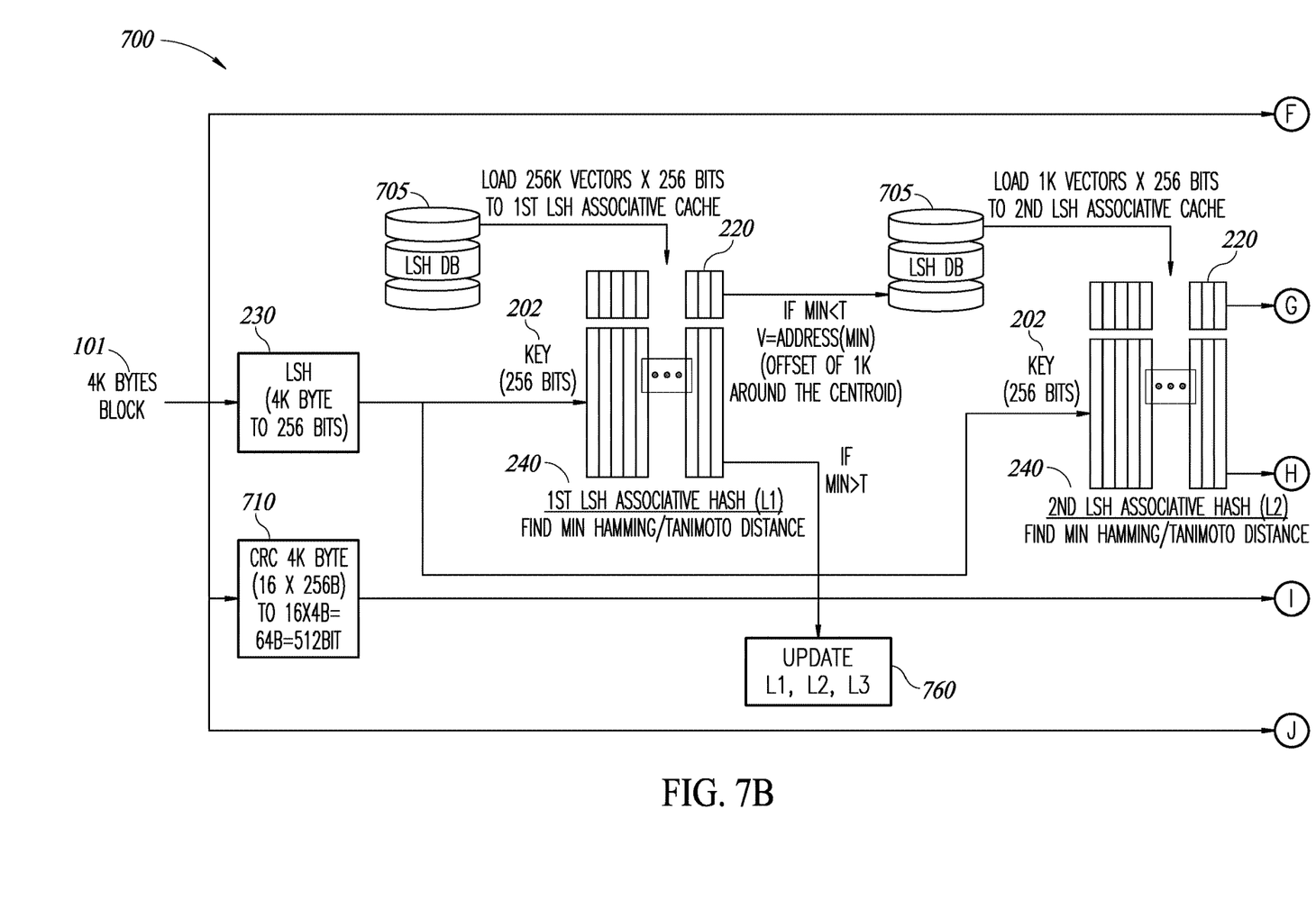
Figure 7C:
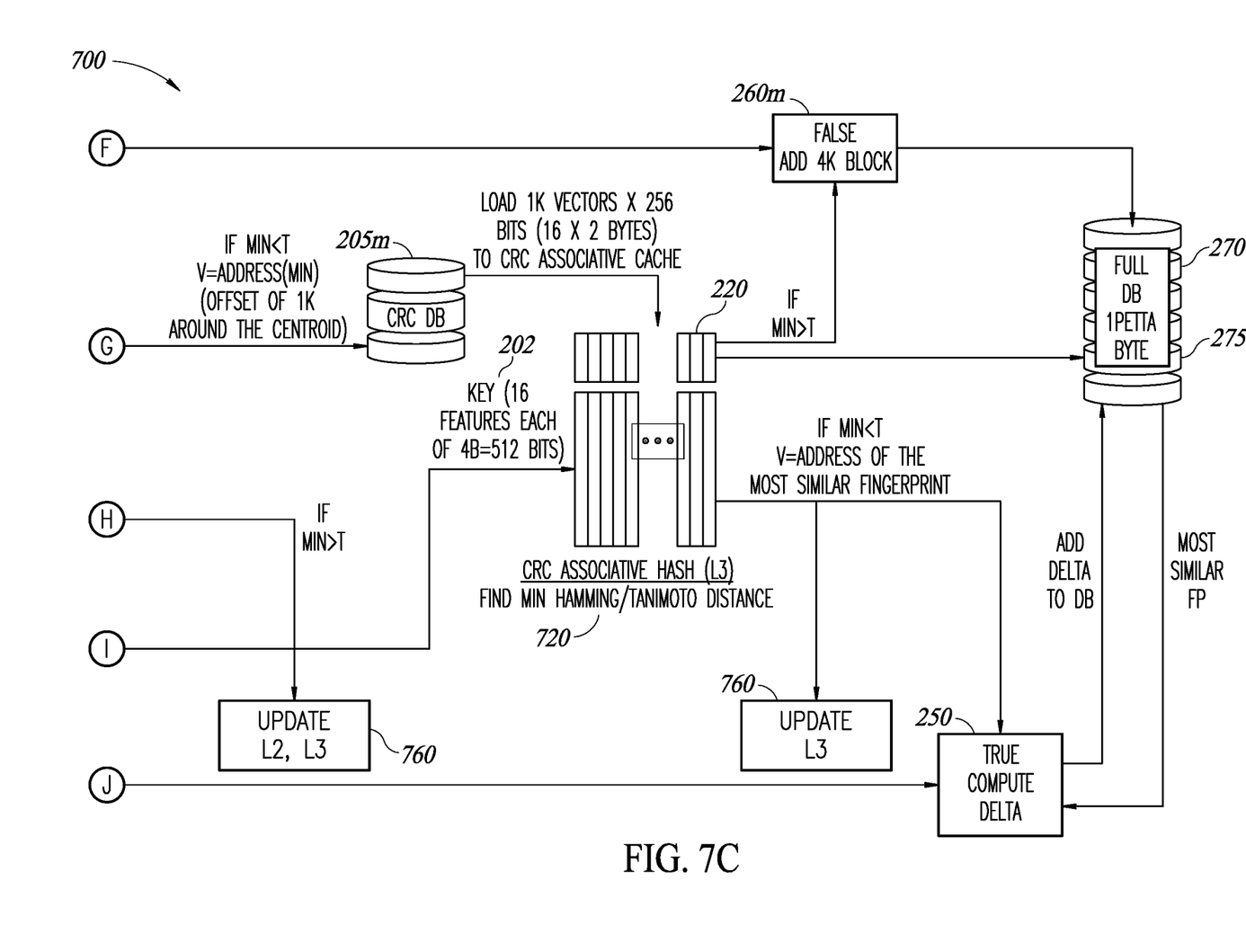

FIGS. 7B and 7C together provide an alternative view of system 700, where identical reference numerals indicate matching elements.

Embodiments of the present invention may be configured to locate blocks similar to an input block and to retrieve a set of similar documents, prior to or instead of storing the new document.

It may be appreciated that deduplication system 700 may require less data storage than standard deduplication systems because two blocks sharing the same content in most of their data (for example if 15 sub-blocks are identical and only one is different) may consume less than two times the size of the block, which will be the storage consumption in standard deduplication systems (in the example the storage consumption of deduplication system 700 may be 1.06 times the size of the block).

It may be appreciated by the person skilled in the art that the steps shown in the different flows described herein are not intended to be limiting and that the flows may be practiced with more or less steps, or with a different sequence of steps, or any combination thereof.

It may also be appreciated by the person skilled in the art that the different parts of the system, shown in the different figures and described herein, are not intended to be limiting and that the system may be implemented by more or less parts, or with a different arrangement of parts, or with one or more processors performing the activities of the entire system, or any combination thereof.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general-purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A deduplication system for a storage unit, the deduplication system comprising:
    an associative memory device to perform associative processing and comprising a memory array having columns divided into sections, of which a fingerprint section stores a plurality of fingerprints associated with blocks of data, each fingerprint being stored in a separate column of said fingerprint section;
    said associative memory device also comprising:
        a similarity searcher operating on said columns to receive an input fingerprint of an input block and to perform a search inside columns of said fingerprint section for a similar fingerprint whose distance to said input fingerprint is smaller than a predetermined threshold value; and
        a difference calculator operating on said columns to compute a difference block indicating relative changes between said input block and a similar block associated with said similar fingerprint, if found; and
    a difference block storage manager to, if said difference block is a non-empty difference block, associate said input fingerprint with said similar block and with said difference block, store said input fingerprint in one column of said fingerprint section, and store said non-empty difference block in said storage unit,
    wherein said fingerprint section is arranged in a multi-level structure wherein upper levels comprise centroids to clusters in lower levels, and a lowest level comprises fingerprints of blocks, said centroids calculated from said fingerprints.

2. The system of claim 1 wherein said storage manager to store said input block if said similar fingerprint was not found.

3. The system of claim 1 also comprising:
    a fingerprint creator to create said new fingerprint using a locality-sensitive hashing (LSH) algorithm.

4. The system of claim 1 wherein said storage manager to store fingerprints of an uppermost level in said columns and wherein said similarity searcher performs said search in said uppermost level and a search in lower levels is performed in a CPU.

5. The system of claim 1 and also comprising:
    a block splitter to split said input block to smaller sub-blocks;
    a collision resistance fingerprint creator to create a collision resistance fingerprint for each of said sub-blocks; and
    an exact searcher to search in said fingerprint section for identical fingerprints matching said collision resistance fingerprints,
    said storage manager to update said fingerprint section with said collision resistance fingerprints and to store sub-blocks for which identical fingerprints were not found.

6. A method for deduplication comprising:
    storing a plurality of fingerprints associated with blocks of data in a fingerprint section of an associative memory device comprising a memory array having columns divided into sections, each said fingerprint being stored in a separate column of said columns and said blocks of data being stored in a storage unit;
    receiving an input fingerprint of an input block;
    searching inside columns of said fingerprint section for a similar fingerprint whose distance to said input fingerprint is smaller than a predetermined threshold value;
    inside said columns of said fingerprint section, calculating a difference block of relative changes between said input block and a similar block associated with said similar fingerprint, if found;
    if said difference block is a non-empty difference block:
        associating said input fingerprint with said similar block and with said difference block,
        adding said input fingerprint in one column of said fingerprint section; and
        storing said non-empty difference block in said storage unit,
        wherein said fingerprint section is arranged in a multi-level structure wherein upper levels comprise centroids to clusters in lower levels, and a lowest level comprises fingerprints of blocks, said centroids calculated from said fingerprints.

7. The method of claim 6 wherein said storing also comprises storing said input block if said similar fingerprint was not found.

8. The method of claim 6 also comprising:
    creating said new fingerprint using a locality-sensitive hashing (LSH) algorithm.

9. The method of claim 6 and also comprising loading fingerprints of an uppermost level into said columns and wherein said searching comprises performing a search in said uppermost level by said associative memory device and performing a search in lower levels by a CPU.

10. The method of claim 6 also comprising:
    splitting said input block into smaller sub-blocks;
    creating a collision resistance fingerprint for each of said sub-blocks;
    performing an exact search to find an exact match to each of said collision resistance fingerprints in said fingerprint section;
    updating said fingerprint section with said collision resistance fingerprints; and
    storing sub-blocks for which identical fingerprints were not found.

11. The method of claim 6 also comprising:
    performing an exact search between said input fingerprint and a database of fingerprints created using a collision resistance algorithm; and
    perform said searching if an exact match is not found.

* * * * *